W. E. WAGNER.
RUNNING GEAR.
APPLICATION FILED APR. 26, 1913.
1,124,079.
Patented Jan. 5, 1915.
2 SHEETS—SHEET 1.
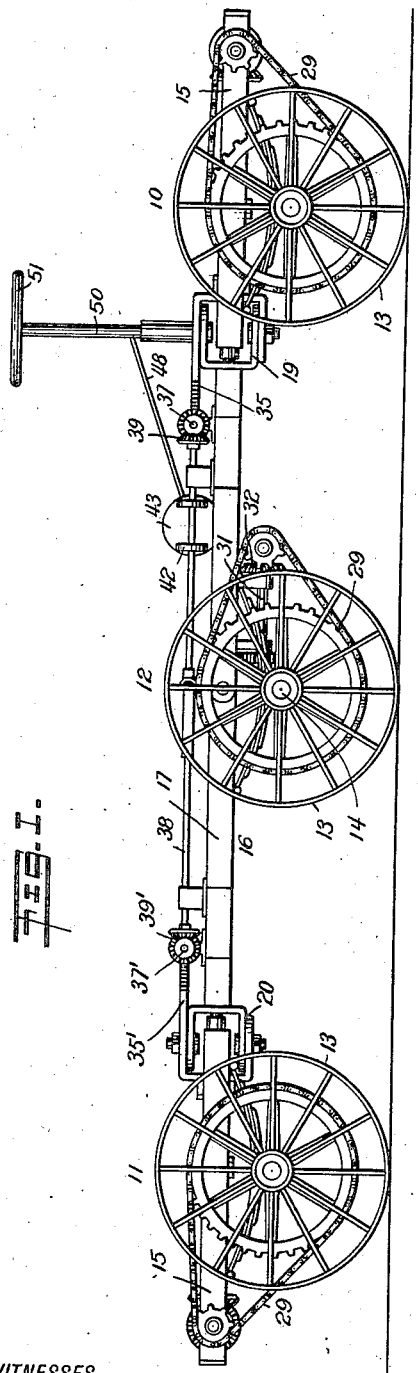
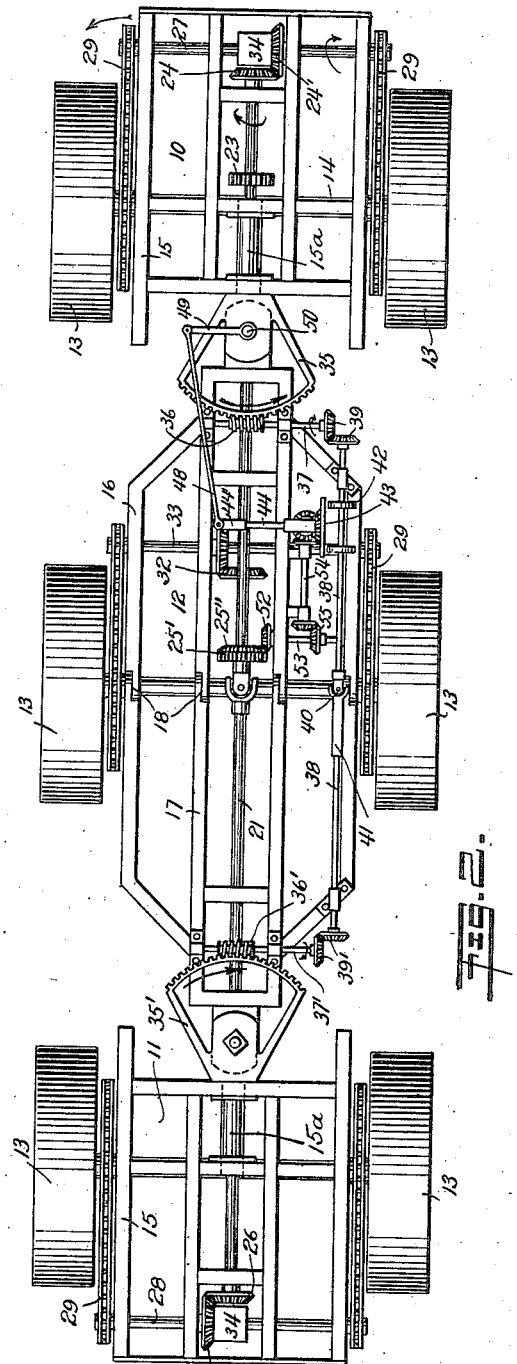
WITNESSES
G. Robert Thomas
Geo. L. Beeler
INVENTOR
William E. Wagner
BY Mmm Co
ATTORNEYS W. E. WAGNER.
RUNNING GEAR.
APPLICATION FILED APR. 26, 1913.
1,124,079.
Patented Jan. 5, 1915.
2 SHEETS—SHEET 2.
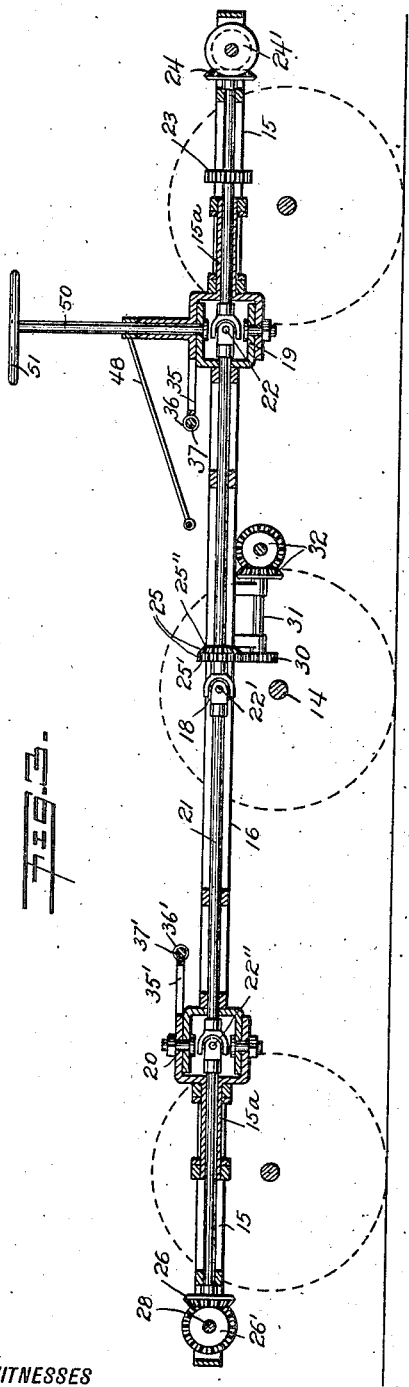
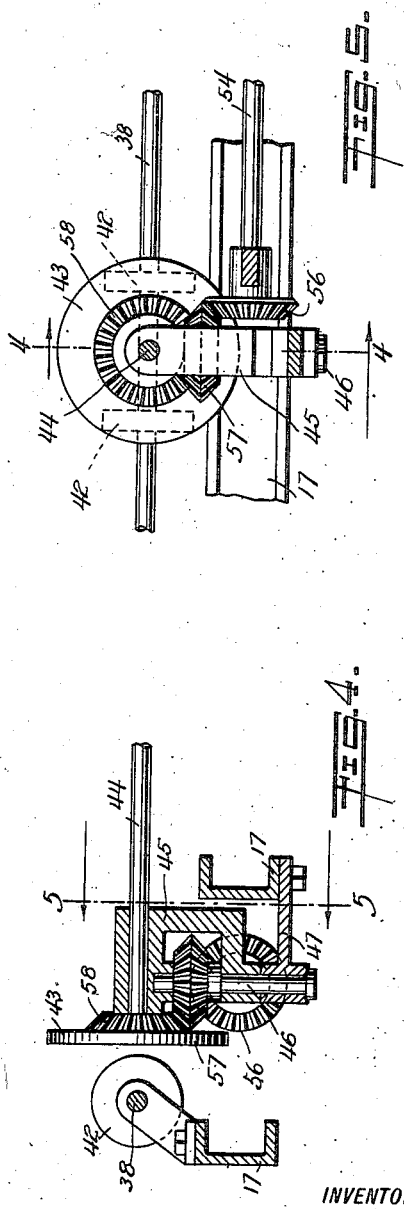
WITNESSES
INVENTOR
William E. Wagner
BY
ATTORNEYS

UNITED STATES PATENT OFFICE.

WILLIAM E. WAGNER, OF DIETZ, WYOMING.

RUNNING-GEAR.

1,124,079.

Specification of Letters Patent.

Patented Jan. 5, 1915.

Application filed April 26, 1913. Serial No. 763,775.

*To all whom it may concern:*

Be it known that I, WILLIAM E. WAGNER, a citizen of the United States, and a resident of Dietz, in the county of Sheridan and State of Wyoming, have invented a new and Improved Running-Gear, of which the following is a full, clear, and exact description.

This invention relates to the running gear of vehicles and has particular reference to traction vehicles of any desired character.

The primary object of this invention is to improve the specific construction of a series of pivotally connected truck elements so as to facilitate the independent action of the several elements with reference especially to the driving devices.

The foregoing and other objects of the invention will hereinafter be more fully described and claimed and illustrated in the drawings forming a part of this specification in which like characters of reference indicate corresponding parts in all the views, and in which—

Figure 1 is a side elevation showing somewhat diagrammatically the running and steering gear of a traction vehicle including at least three truck elements; Fig. 2 is a plan view of the same; Fig. 3 is a longitudinal section particularly of the propelling devices; Fig. 4 is a vertical detail of the driving mechanism for the steering gear on the line 4—4 of Fig. 5; and Fig. 5 is a vertical section on the line 5—5 of Fig. 4.

The several parts of this device may be made of any suitable materials and the relative sizes and proportions, as well as the general design thereof, may be varied to a considerable extent without departing from the spirit of the invention hereinafter described and specifically claimed. I would have it understood also in this connection that the vehicle, as above premised, may be of any suitable nature or used for any desired purpose, either for the conveyance of passengers, freight or various commodities.

Referring more particularly to the drawings, I show a series of elements comprising a front truck 10, a rear truck 11, and an intermediate truck 12. Each of these trucks includes a pair of traction wheels 13, an axle 14, and a frame. The frames 15 of the front and rear elements are substantially alike, and each includes a quill or spool 15ª through which the frame may tilt around a longitudinal central axis, but the frame 16 of the intermediate element is of a different character. This frame is made up of a plurality of substantially longitudinal stringers 17, each of which is jointed at 18 and extends practically in the vertical plane of the axle 14 of such element. It will be understood that a device made in accordance with this invention may be of considerable length and hence the several frame members must be connected pivotally for free universal movement with respect to one another. In other words, the truck wheels 13 of the intermediate element may be free to drop below or rise above the plane of the rest of the wheels and yet support their share of the load due to the joints 18 of the frame 16. The frame 16 is connected to the front frame 15 by means of a pivoted joint 19 whereby the front truck is adapted to be steered laterally in either direction with respect to the intermediate frame. The rear truck is connected by a similar joint 20 to the rear end of the intermediate frame whereby the rear truck may be steered laterally.

Any suitable means may be provided for propelling the vehicle, such means including a main driving shaft 21 extending longitudinally of the running gear from one end to the other and having a series of universal joints 22, 22' and 22'' located adjacent the joints 19, 18 and 20 respectively, whereby the power shaft 21 may operate freely regardless of all necessary irregularities due to rolling roads or lateral steering, and constitute the axis of each of the aforesaid quills 15ª. I show at 23 a pinion connected to the driving shaft adjacent the front truck, and it will be understood that any suitable motor may be carried upon said truck and in mesh with said pinion. Said shaft 21 also has connected to it a series of gears 24, 25 and 26. The bevel gears 24 and 26 mesh respectively with and drive bevel gears 24' and 26' connected to transverse shafts 27 and 28 from which the front and rear wheels 13 are driven through sprocket chains 29. The gear wheel 25 has two parts, namely, a spur member 25' and a bevel member 25'', the former meshing with and driving a spur gear 30 on a countershaft 31 connected through miter gears 32 with a transverse shaft 33 from which the middle pair of traction wheels are driven through sprocket gearing of the same character as that above described in connection with the front and rear elements. It will be understood, however, that the specific form of gearing herein shown need not be maintained in all instances, it being noted that all of the trucks are driven simultaneously and in the same direction from the same power shaft, and by this fact all of the elements will be driven, irrespective of the number of them or the distance between the first and last. If desired, I may employ differential mechanism 34 in connection with the miter gears between the transverse shafts and the main power shaft.

A quadrant 35 is rigidly connected to the front quill 15$^a$ and extends in a horizontal plane rearwardly therefrom, the center of the quadrant being in the vertical axis of the joint 19. A worm 36 mounted upon a transverse shaft 37 is in mesh with the quadrant 35, whereby, when the worm is rotated, the quadrant is shifted circumferentially around said axis of the joint 19 and the front truck is steered laterally in one direction or the other. A quadrant 35' is connected to the rear truck quill and extends forwardly therefrom and is controlled by a worm 36' similarly mounted upon a transverse shaft 37' for a similar purpose. Any suitable mechanism may be employed, operative from the power shaft or otherwise, to rotate both of said worms in unison, whereby both of the front and rear trucks may be steered simultaneously but in opposite directions with respect to the intermediate truck element. To carry out this proposition in a simple and practical manner I employ a longitudinal countershaft 38 having miter gear connections 39 and 39' with the worm shafts 37 and 37'. Said countershaft 38 is provided with a universal joint 40 and a telescopic sleeve 41 adjacent the joint 18 of the middle section in order to compensate for all possible movements of the frame 16. The shaft 38 has secured to it a pair of friction wheels 42 adapted to be driven in alternation by a friction disk 43 mounted upon a shaft 44. The shaft 44 is journaled in a pivoted frame 45, adapted to oscillate on the vertical pivot 46 secured upon a fixed bracket 47, in turn connected to one of the stringers 17 of the intermediate element. The pivot 46, therefore, may be considered as a fixed pivot or axis for the frame 45, whereby, when the shaft 44 is oscillated in a substantially horizontal plane, the disk 43 will be caused to bear against and drive one or the other of the friction wheels 42. The oscillation of the shaft 44 may be effected by means of a rod 48 pivoted at one end to a sleeve 44' constituting an extension of or bearing for the shaft 44, and the rod 48 is pivoted at its other end to an arm 49 extending outwardly from a steering post 50 upon the upper end of which is connected a handle or steering wheel 51. The steering post is located in the exact axis of the joint 19. In the normal or mid position of the steering devices the disk 43 will have no driving effect upon the wheels 42, but upon turning the wheel 51 in either direction the shaft 38 will be driven in the corresponding direction through frictional engagement between the disk 43 and one of the wheels 42.

Power may be transmitted to the disk 43 by any suitable means, but I show for this purpose gearing as follows: The part 25'' of the double gear 25 meshes with and drives a bevel pinion 52 which drives a transverse shaft 53 having connection with a shaft 54 through miter gears 55. The shaft 54 has connected to it a bevel gear 56 meshing with a double bevel gear 57 mounted upon the pivot shaft 46 and meshing on its opposite side with a bevel gear 58 forming a part of the disk 43 and hence mounted upon the shaft 44. It will appear, therefore, that the rotation of the shaft 54 from the main power shaft 21 will be transmitted to the disk 43 irrespective of the swing or adjustment of the frame 45 around the pivot 46, although as a matter of fact, the extent of movement of the disk toward or from the friction wheels 42 will never be very great.

Having thus described my invention, I claim as new and desire to secure by Letters Patent:—

1. The herein described vehicle construction comprising, in combination, a central truck section, a driving power shaft extending longitudinally through said section, front and rear truck sections connected to the first mentioned section and so arranged with respect to the power shaft as to tilt laterally around the axis thereof independently of each other and said first mentioned section, a transverse driving shaft carried by each truck section, gearing connections between the ends of each transverse shaft and the adjacent truck wheels, and bevel gear connections between said power shaft and all of said transverse shafts, whereby all of the truck wheels are driven simultaneously from the same source of power.

2. In a device of the character set forth, the combination of a plurality of truck elements each comprising a frame and a pair of truck wheels, each frame being connected to the next adjacent frame by means including a quill extending longitudinally and centrally of the device providing for tilting movement of certain of said frames around the axis of the quill, a power shaft journaled longitudinally of the series of frames and extending through said quills, and means to drive all of said truck wheels simultaneously from said shaft, said driving means including a transverse shaft associated with each pair of wheels, sprocket gearing between said transverse shaft and both wheels of the pair, and bevel gearing between the transverse shaft and the longitudinal power shaft.

In testimony whereof I have signed my name to this specification in the presence of two subscribing witnesses.

WILLIAM E. WAGNER.

Witnesses:
JAMES H. BURGESS,
F. B. RAMSEY.